Jan. 14, 1941.  W. S. CHILDERSS  2,228,558
PORTABLE IMPLEMENT SUPPORT
Filed June 21, 1938  5 Sheets-Sheet 3

William S. Childerss INVENTOR.
BY Jesse R. Stone
Lester B. Clark
ATTORNEYS.

Jan. 14, 1941.  W. S. CHILDERSS  2,228,558
PORTABLE IMPLEMENT SUPPORT
Filed June 21, 1938   5 Sheets-Sheet 4
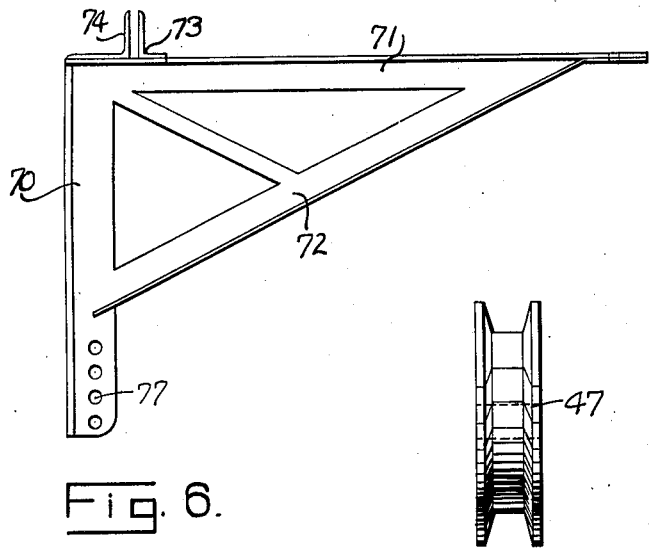
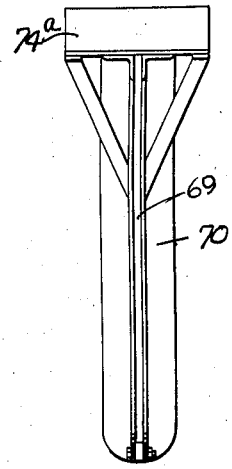
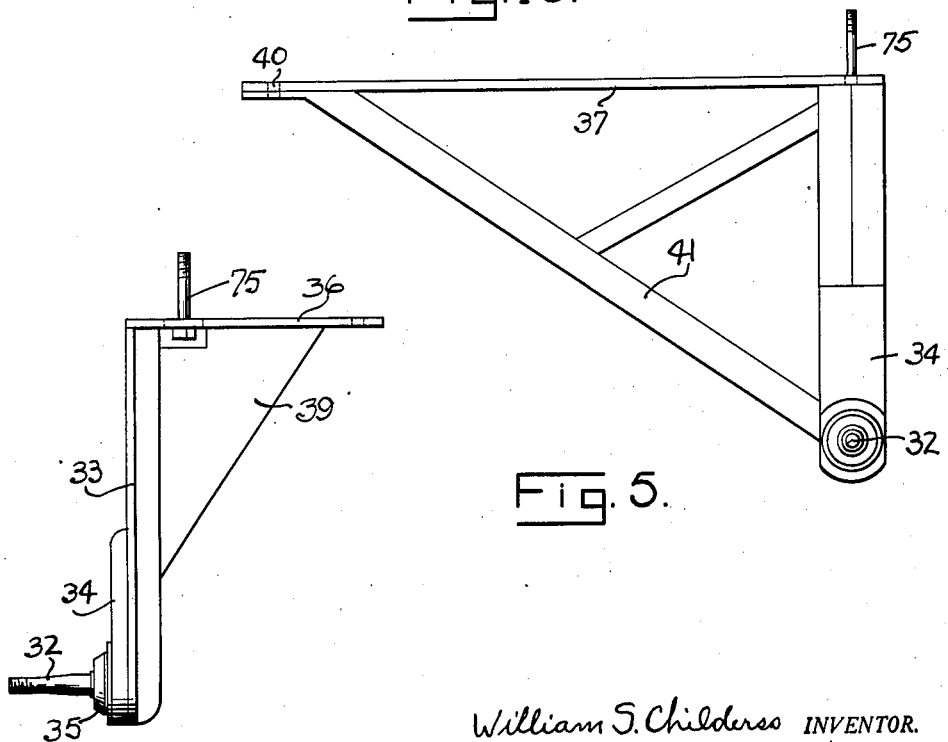

Jan. 14, 1941.  W. S. CHILDERSS  2,228,558

PORTABLE IMPLEMENT SUPPORT

Filed June 21, 1938  5 Sheets—Sheet 5

William S. Childerss INVENTOR.

BY Jesse R. Stone
Lester B. Clark
ATTORNEYS.

Patented Jan. 14, 1941

2,228,558

UNITED STATES PATENT OFFICE 2,228,558

PORTABLE IMPLEMENT SUPPORT

William S. Childerss, Livingston, Tex.

Application June 21, 1938, Serial No. 214,951

10 Claims. (Cl. 97—237)

My invention relates to portable supports or trucks upon which agricultural implements may be supported.

It is an object of my invention to provide a portable frame which may be employed to support a plurality of agricultural implements of different types, the frame being so arranged that several such implements may be supported and adjusted into position spaced from each other along the frame.

I aim to provide a frame and convenient means connected thereto for the support of various agricultural implements and to arrange for ready adjustment of the supports and implements to any desired position relative to each other.

It is a further object of the invention to mount the frame upon wheels in such manner that it may be easily guided along the rows of plants in the field.

My invention resides in the particular construction of the supporting frame, the provision thereon of spaced bars or hangers for the implements and in the support for the frame whereby it is readily guided along the field.

The invention also includes provision in connection with the frame of an effective device for raising and lowering the implements when it becomes necessary to do so.

With reference to the drawings herewith wherein the construction of the device is illustrated, Fig. 1 is a side view in perspective showing the construction of my device, the raising and lowering mechanism being shown on only one side of the frame.

Figs. 4 and 5 are front and side views, respectively, of the bracket and axle for the supporting side wheels.

Fig. 6 is a side view of a supporting hanger for attachment to the forward end of the frame and to furnish attachment for implements.

Fig. 8 is an end view of a hanger or space bar employed at the rearward end of the frame.

Fig. 13 is a front view of a pulley employed in raising and lowering the implements.

Figure 1:
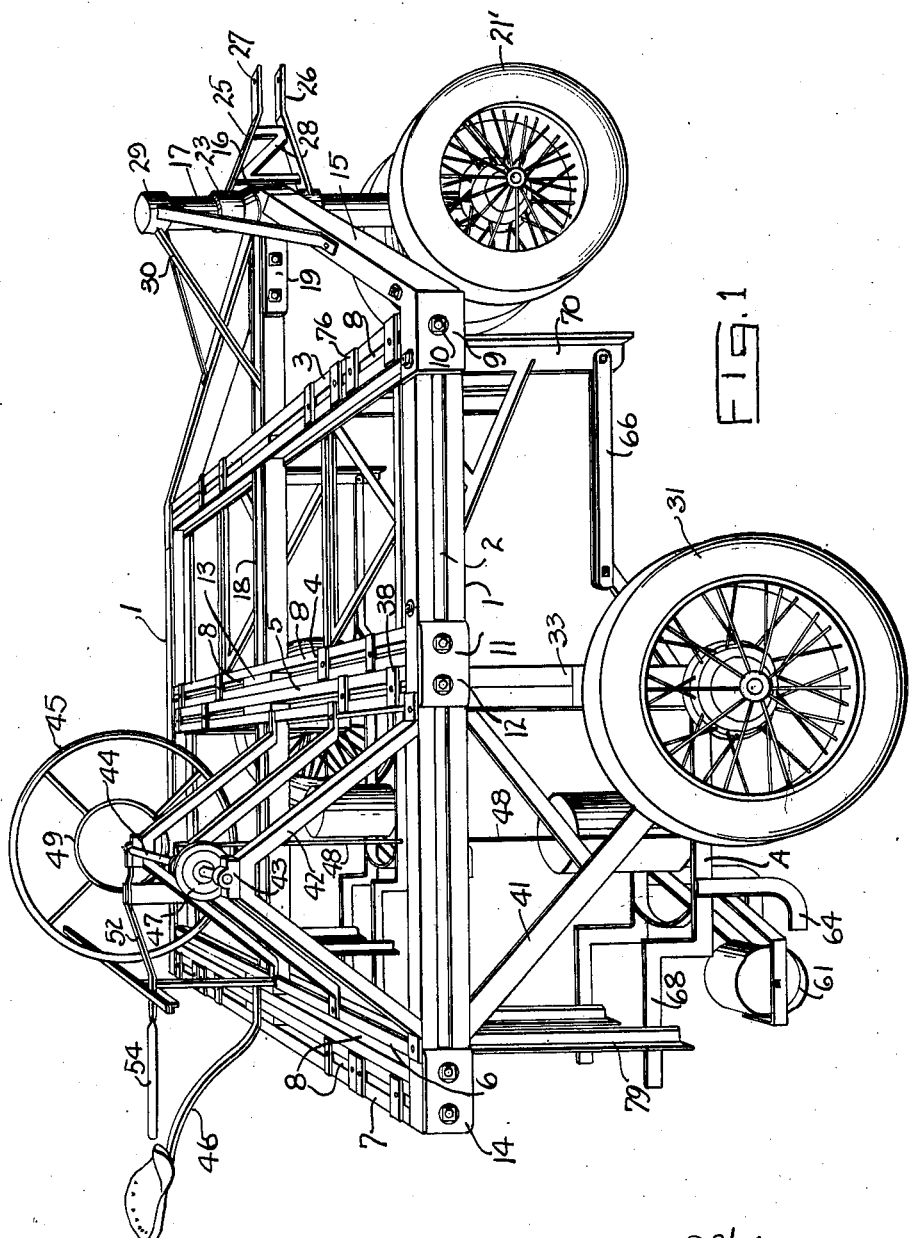

The supporting frame which comprises the main feature of my invention is preferably made up of structural steel mostly angle iron and channel iron construction although the said frame may be made up of any preferred material. I have shown the frame as comprising two side beams 1, each beam being made up of upper and lower angle iron members having spaces indicated at 2 between said irons. The two side members are connected across by a plurality of cross beams 3, 4, 5, 6 and 7.

The cross beam 3 at the forward end of the frame is similar in construction to the other cross beams. This beam is made up of two steel members spaced in such manner as to provide between them a longitudinal slot 8. The ends of the two steel members making up the beam 2 are connected to the side members 1, and a plate or bracket 9 assists in joining the cross beams to the side members 1. Draw bolts 10 extending through the side plates and into spacing members between the two parts of the beam 3 hold the frame rigidly together.

The cross beams 4 and 5 are closely adjoining each other about midway of the longitudinal portion of the frame. They are secured at their ends to the side beams 1 by plates 11 with draw bolts 12 therethrough to connect the cross beams rigidly with the side members. Each of the beams 4 and 5 have slots 8 between them, the width of the slots being determined by spaced blocks 13 between the adjacent portions of the beams.

At the rearward end of the frame the beams 6 and 7 are similar in construction, each composed of two transverse members spaced apart to provide slots 8 between the adjacent beams. End plates 14 at the rearward corners of the frame are employed in securing the beams to the side members, as has been previously noted.

At the forward end of the frame the two side plates 9 previously described are connected with forwardly converging frame members 15. I have shown these frame members as integral with the plate 9 and such structure is preferred although it is obvious that they could be formed separately. These converging frame members are secured at their forward ends to a hub or bushing 16 adapted to fit about a hollow shaft 17.

There is a center beam 18 which extends longitudinally of the frame about centrally thereof and projects forwardly from the beam 3 to connect with plates 19 which in turn are secured to said bushing 16.

Figures 3, 9:
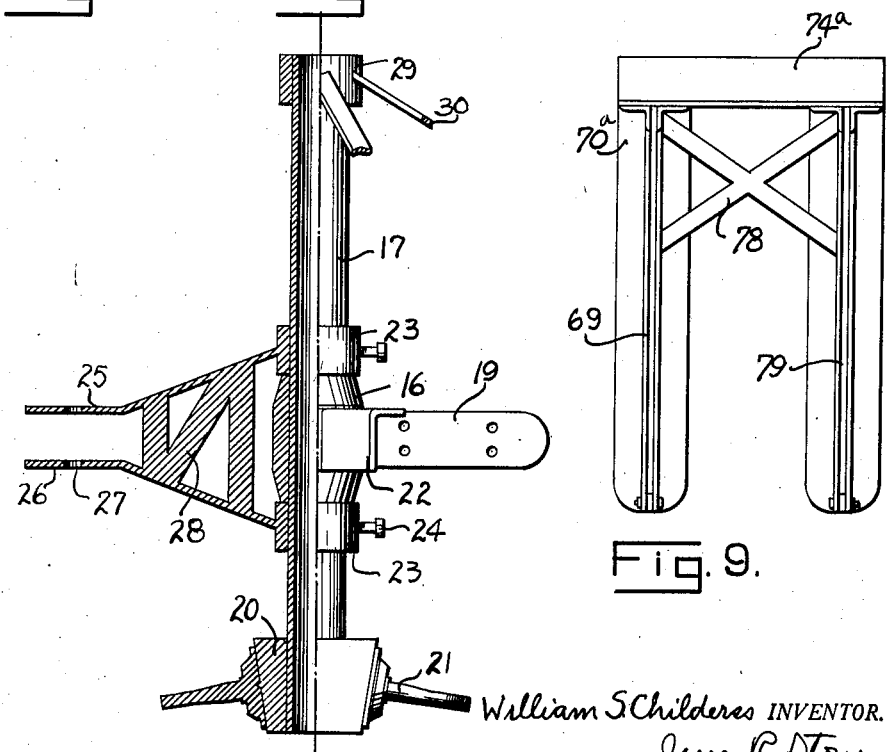
Fig. 3 is a broken detail illustrating the mounting for the forward support for the frame.
Fig. 9 is an end view of the double space bar or hanger for use with the various implements which may be supported on the frame.

With reference particularly to Fig. 3, the bushing 16 mounted upon the shaft 17 which is a short vertically extending post or shaft, the lower end of which is rigidly connected with a downwardly tapered hub 20. Said hub forms a mounting for two oppositely extending axles 21 upon which the forward wheels 21' are supported. Said axles are downwardly inclined and threaded at their outer ends for connection with the hub cap in the usual manner. It will be seen that the shaft 17 is rotatable in the bushing 16, said bushing being secured by means of the plates 19 and 22 to the frame members, and the plate 19 being secured to the center beam while the plates 22 are secured within the frame members 15.

Above and below the bushing 16 I provide upon the shaft two collars 23 which may be fixed to the shaft or post by means of set screws 24. Upon the two collars I form a forwardly extending coupling member 25, which terminates at the forward draft end in two faces parallel plates 26 which are formed with openings 27 therein to receive a coupling pin. These two plates are connected across by brace members 28 and form a coupling by means of which my portable frame may be connected with some means of traction such as tractor, or a team of horses, in the usual manner.

At the upper end of the shaft 17 is a lateral supporting collar 29, which assists in holding the shaft in alignment but allows rotation of the shaft therein. Braces 30 connect said collar with the frame members, as shown particularly in Fig. 1.

The two wheels 21' which are mounted upon the spindles or axles 21 are mounted close together and in fact form a dual wheel, which forms a substantial support for the forward end of the frame but allows the easy steering of the frame as these wheels are pivoted about the vertical axis formed by the shaft 17 supported in the frame as described. The frame is also supported by two side wheels 31, one of which is placed at each side of the frame about midway of the length thereof. Said wheels are mounted upon spindles 32 projecting outwardly from the axle braces 33.

With reference particularly to Figs. 4 and 5, the construction of the axle brace 33 will be seen. There is a downwardly extending leg member of structural steel on the outer side of which is a reenforcing plate 34, upon which the inner ends 35 of the spindles 32 are rigidly secured. At the upper end of the supporting leg or post 33 of the brace member are two laterally extending plates 36 and 37. The plates 36 extend transversely of the frame along the cross beam 5 and are secured to said beam 5 by upwardly extending bolts 75, which project upwardly within the slot 8 in said beam and are secured at their upper ends within transverse plates or washers 38. There is a web 39 of steel connecting the upright leg 33 with the plate 36 for purposes of reenforcement.

The plate 37 is extended longitudinally of the frame and is secured to the cross beam 6 at its rearward end by bolts extending through the opening 40 therein. The rearward extending plate may also be braced, as shown at 41, for the purpose of strengthening the same.

For the purpose of supporting an implement operating mechanism I provide at the upper side of the frame a plurality of supports 42, which comprise two upwardly converging legs flattened at the upper end so as to form a support for bearing members 43. I show three of these supporting members in Fig. 1, and I wish it to be understood that in ordinary operation a similar set of three supporting members 42 are mounted on the opposite side of the frame, these supports in the present showing being omitted for purposes of clearness.

Within the bearings 43, at the upper end of these three supports, is a rotatable shaft 44 upon one end of which is mounted a hand wheel 45, said hand wheel being fixed upon the shaft and furnishing a means whereby the operator seated upon the seat 46 of the rearward end of the frame may rotate the shaft to raise and lower the implement carried thereby. On the shaft is mounted a pulley 47 which, as shown in Fig. 13, forms a short spool or drum upon which a cable may be wound, such as cable 48. Said cable 48 is secured to said pulley and is extended downwardly for connection with the frame of the implement carried by the vehicle. In this particular case the implement designated as A is a planter but, as will be understood, any desired form of agricultural implement may be employed.

Figure 2:
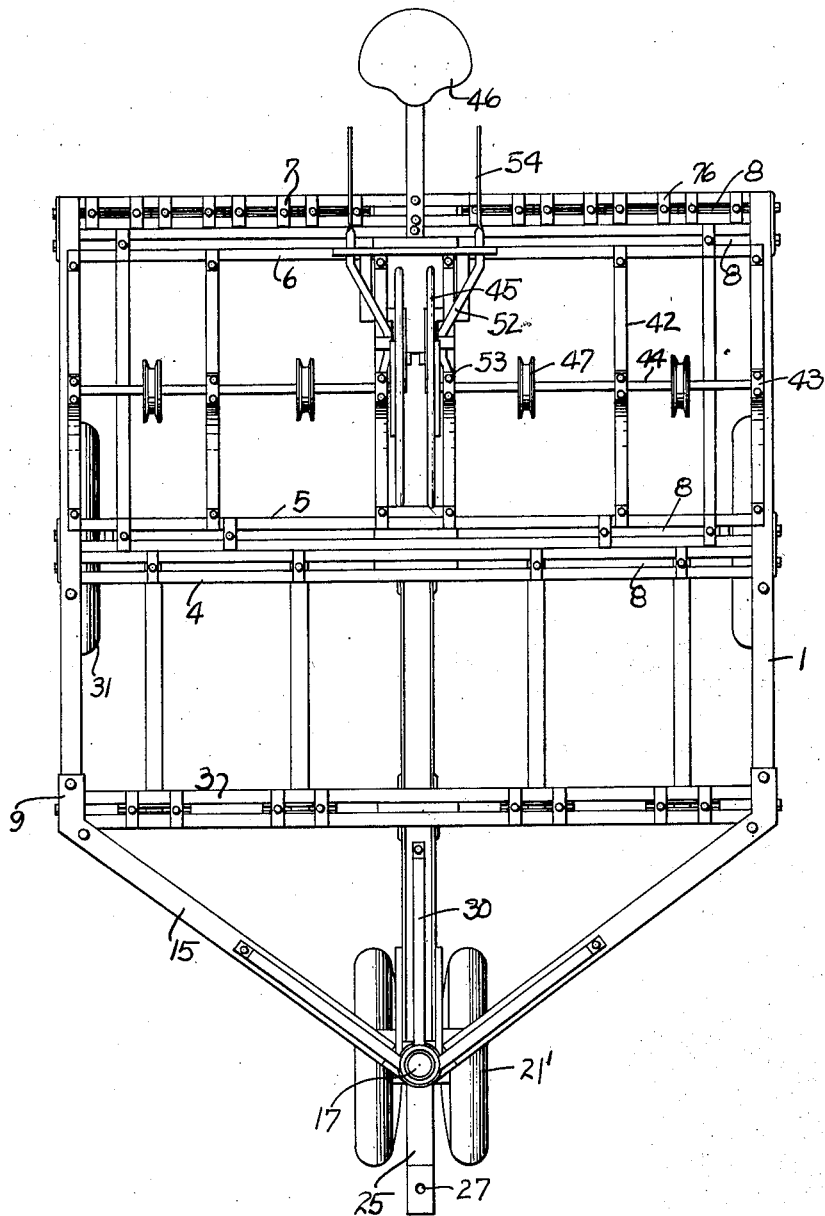
Fig. 2 is a top plan view of my assembled device.

Mounted on the frame of the hand wheel and spaced outwardly from the hub is a circular ratchet member 49. Said ratchet is shown best in Figs. 11 and 12. The teeth 50 of said ratchet are adapted to be engaged by a latching member 51, which is formed upon a lever 52, pivoted at its forward end 53 to the frame as best shown in Fig. 2. The lever arm is bent inwardly to engage with the ratchet 49 and then is flared outwardly and connected with a rearwardly extending handle 54 adjacent the seat 46, upon which the operator is seated. It will be understood that, with reference to Fig. 2, the operator may move the handle 54 laterally to unlatch the hand wheel by contact with said handle by the knees of the operator. Thus the device may be unlatched by movement of the knee of the operator while the operator's hands may be employed in rotating the hand wheels 45.

Figures 11, 12:
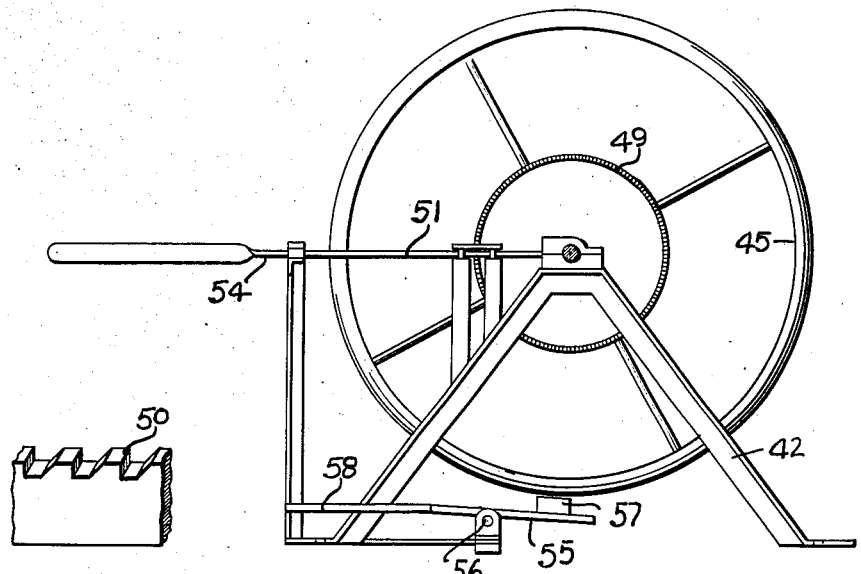
Fig. 11 is a side view of the raising and lowering device which may be employed with the implements on the frame.
Fig. 12 is a broken detail of the ratchet employed in latching the implements in raised or lowered position.

As will be seen in Fig. 11, I provide a brake consisting of a lever 55 pivoted on the frame at 56 and having a block 57 thereon to engage the hand wheel. Thus when the operator depresses the lever by engagement at 58 with his foot the brake will be brought into frictional contact with the hand wheel and hold the implement in the desired position while the latch is being engaged. The brake will also slow down the dropping of the implement when it is to be lowered.

Figure 10:
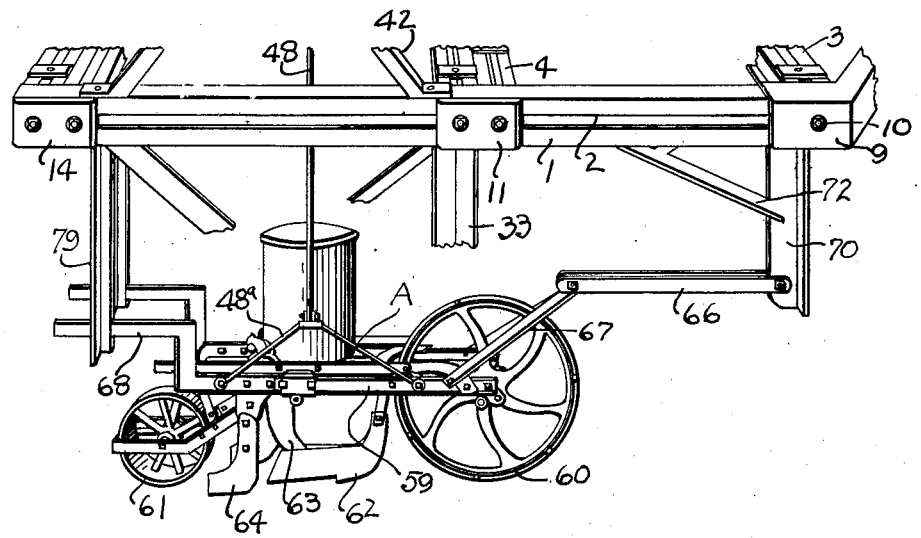
Fig. 10 is a broken side view of the frame showing an agricultural implement supported thereon.

As illustrative of an agricultural implement which may be supported upon the frame, I have shown a seed planter disclosed best in Fig. 10. The construction of this planter shown at A forms no part of the invention. It will be understood, however, that the planter includes a frame 59 having a forward guide wheel 60 and a rearward covering wheel 61. There is a plow 62 which opens a furrow in front of the seed dropper 63 and rearward plates 64 which cover up the seed in front of the rearward wheel 61. Such an implement or any other embodiment, such as a plow or harrow, may be secured to the frame in the manner shown in connection with the planter. I connect at the forward hanger member 70 a plurality of rearwardly extending links 66, which are in turn secured by strap members 67 to the frame 59 of the implement. These serve to exert from the frame of the vehicle a traction upon the frame of the implement. At the rearward end of the said implement A I secure two rearwardly extending guide plates 68 which are adapted to engage slidably within the slots 69 and 79 of the rearward hanger member 70a. It will be understood that the two guide plates 68 are slidable both vertically and longitudinally within the slots 69 and 79 to allow raising and lowering of the implement by means of the cable 48, which is secured to the frame 59 of the implement A by branches 48a thereon. It will be understood, therefore, that the implement may be raised out of operative engagement with the ground by reeling up the cable upon the pulley 47 in the manner previously described.

Figure 7:
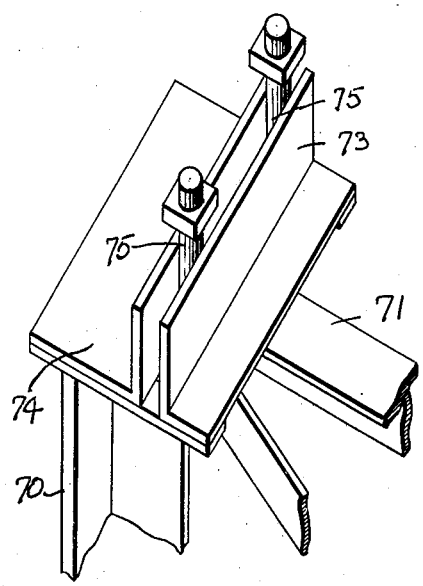
Fig. 7 is a broken detail showing the method of attachment of the supporting hanger, shown in Fig. 6.

The hanger members 70 and 70a are features of the invention. The construction of the hanger member 70 is shown best in Figs. 6 and 7. Each of these hangers comprises a triangular member including an upright portion 70 and a horizontally positioned member 71. These two members are connected diagonally by a brace member 72. On the upper side of the horizontal member 71 and near the forward end thereof are two sections of angle iron 73 which are spaced slightly apart and have the upwardly projecting webs 74 thereon adapted to fit within the slot 8 between the two members of the beam 3. With reference to Fig. 7, it will be seen that I extend upwardly between the two vertical portions of the members 73 and 74 clamping bolts 75, which project through the slots 8 in the cross beams and are connected through plates or washers 76, as shown in Fig. 1. I show two such bolts as forming a connection for the forward ends of said hangers. The vertical portion 70 of the hanger member comprises a T iron having a plurality of openings 77 through which connection with the traction arm 66 may be made.

The rearward hanger members 70a are shown best in Figs. 8 and 9. They are similar in general construction to the hanger already described but the upwardly extending plates 74a thereon connect the two hangers of the Fig. 9 embodiment together so that they may be employed as a unit. Cross braces 78 assist in forming a rigid connection between the two portions of the double rearward hangers. Spaces 69 and 79 between adjacent portions of each of the rearward hangers furnish guides to receive one arm of an implement or the two arms 68 of the implement as has been previously described.

It will be understood that a plurality of separate implements may be attached to the frame in spaced relation transversely thereof. For example, if two planters are employed, as shown in the drawings, they may be spaced apart the desired distance between adjacent rows to be planted. This distance may be varied to suit the desire of the operator by adjustment transversely of the frame by sliding the hangers along in the slots 8 of the frame before the bolts are tightened to fix the hangers in rigid supporting position. At other times when different implements such for example as cultivators or harrows are to be employed more than two may be desired and it will be obvious that a larger number of implements may be readily secured to the frame by positioning the hangers to which the implements are secured in proper adjusted position transversely of the frame and some may be secured toward the forward end and others adjacent the rearward ends. The hangers will provide the proper connection of each implement with the frame and the operation thereof will be clearly understood from the description already given.

Further the forward end of the frame may be adjusted vertically along its attachment to the shaft 17 simply by loosening the set screws 24. The wheels 31 may also be spaced along the frame at any desired point to accommodate the spacing of the rows of cotton, corn, or other plants.

The mounting of the frame upon the three wheels, that is, the two spaced side wheels and the dual wheel 21', makes a substantial support for the frame and yet allows it to be easily guided along the field and in turning corners when the end of the field is reached. It will be understood therefore that I have provided a universal frame or support for various kinds of agricultural implements which may be placed in position or removed from the frame with a minimum consumption of time and labor. The device is adapted for use throughout the season, first, in plowing and harrowing the soil, then in planting it, and later in cultivating the growing crops. It enables the operator to control the operation of a plurality of separate implements without difficulty. The further advantages of this construction will be obvious to those skilled in the art.

What is claimed is:

1. A portably supported rectangular frame, side beams thereon, front, intermediate and rear cross beams, each of said cross beams being longitudinally slotted, implement hangers adjustably secured in said slots, a pair of vertically slotted guide hangers secured in said rear cross beams, an implement supported upon the ground below said frame, draw plates connecting said implement with a hanger at the forward end of said frame, and guide arms at the rear end of said implement engaging within the slots of said rearward guide hangers.

2. A portably supported rectangular frame, side beams thereon, front, intermediate and rear cross beams, each of said cross beams being longitudinally slotted, implement hangers adjustably secured in said slots, a pair of vertically slotted guide hangers secured in said rear cross beams, an implement below said frame, draw plates connecting said implement with a hanger at the forward end of said frame, means on said frame to raise and lower said implement, and guide arms at the rear end of said implement engaging within the slots of said rearward guide hangers.

3. A portable implement frame including transversely extending beams thereon having slots longitudinally of said beams, hangers formed of structural steel, a depending leg on each hanger having a vertical slot therein, upwardly extending plates on said hanger to engage in one of said slots, and an upwardly extending bolt between said plates to engage a washer and secure said hanger to said frame.

4. A portable frame, forward and rearward wheels to support said frame, hangers adjustable laterally on said frame, said hangers comprising arms extending downwardly to a point near the ground, rearwardly extending arms on said hangers at their upper ends, adjustable means securing both ends of said rearwardly extending arms to said frame, links secured to the lower ends of said hangers, an agricultural instrument on the ground below said frame, draft connections between said instrument and said links, and guide hangers at the rearward end of said frame acting to hold the rearward end of said instrument aligned with the forward end.

5. A frame including parallel transverse beams and longitudinal connecting members, downwardly extending hangers to which various agricultural implements may be attached, means to connect said hangers adjustably to said frame, links secured to said hangers spaced somewhat from the ground, means on said links to detachably engage an agricultural implement, guide hangers adjustable along the rearward end of said frame, said guide hangers having guide slots therein to coact with an agricultural instrument to maintain the same in alignment.

6. A portably mounted implement frame, means for attachment of traction means thereto, laterally adjustable hangers projecting downwardly from said frame, and to which various agricultural instruments may be connected, an agricultural implement below said frame and normally supported upon the ground, means connecting said implement to one of said hangers to move said implement, a pulley mounted above said frame, a hand wheel to manually rotate said pulley, a cable on said pulley connected with said implement to raise or lower said implement when said pulley is rotated, and a brake engaging said hand wheel and operative to retain said wheel in adjusted position.

7. A frame for agricultural instruments including longitudinal and transverse members, said longitudinal members comprising spaced upper and lower angle irons, said transverse members comprising pairs of laterally spaced irons which are secured between said spaced longitudinal members, wheels supporting said frame in spaced relation above the ground, hangers secured to said transverse members for adjustment along the same and projecting downwardly from said frame to a point adjacent the ground, and an agricultural implement supported on the ground and flexibly connected with said hangers, and means on said frame rearwardly of said implement to guide said implement.

8. A portable frame for agricultural implements, including two side frame members of structural steel, each side frame member consisting of upper and lower angle irons spaced slightly apart, front, intermediate and rear cross frame members, each including a plurality of spaced steel beams providing between them slots for adjustable attachment therein of implement supporting devices, front and rear hangers laterally adjustable in said slots, an agricultural implement separately supported below said frame, a draft connection on one of said front hangers with said implement, a guiding support in one of said rear hangers therefor, and wheels for supporting said frame.

9. A portable frame for agricultural implements, including two side frame members of structural steel, front, intermediate and rear cross frame members, each including a plurality of spaced steel beams providing between them slots for adjustable attachment therein of implement supporting devices, hangers laterally adjustable in said slots and extending downwardly from said frame to a point adjacent the ground, an agricultural implement supported on the ground to travel below said frame, draft and guide connections between said hangers and said implement, means to elevate the said implement, and wheels for supporting said frame.

10. A portable agricultural instrument comprising a frame having longitudinal and transverse members, wheels supporting said frame in spaced relation above the ground, hangers secured to a transverse member for adjustment along the same and projecting downwardly therefrom to a point adjacent the ground, an agricultural implement supported on the ground and flexibly connected with said hangers, and means on said frame rearwardly of said implement to guide the implement.

WILLIAM S. CHILDERSS.